July 27, 1937.  C. SAUZEDDE  2,087,926

SEGMENTAL DUAL-FACED SECTIONAL-TYPE BRAKE SHOE

Filed Jan. 14, 1932  3 Sheets-Sheet 1

INVENTOR
Claude Sauzedde,
BY
ATTORNEYS

July 27, 1937.  C. SAUZEDDE  2,087,926

SEGMENTAL DUAL-FACED SECTIONAL-TYPE BRAKE SHOE

Filed Jan. 14, 1932  3 Sheets-Sheet 2

INVENTOR
Claude Sauzedde,
BY
ATTORNEYS

July 27, 1937.  C. SAUZEDDE  2,087,926

SEGMENTAL DUAL-FACED SECTIONAL-TYPE BRAKE SHOE

Filed Jan. 14, 1932   3 Sheets-Sheet 3

INVENTOR
Claude Sauzedde
BY
ATTORNEYS

Patented July 27, 1937

2,087,926

UNITED STATES PATENT OFFICE 2,087,926

SEGMENTAL DUAL-FACED SECTIONAL-TYPE BRAKE SHOE

Claude Sauzedde, Detroit, Mich., assignor to Detroit Hydrostatic Brake Corporation, Detroit, Mich., a corporation of Michigan Application January 14, 1932, Serial No. 586,596

7 Claims. (Cl. 188—152)

The present invention relates to improvements in brake shoe structures.

In companion applications, hereinafter identified, are disclosed various forms of a hydrostatically-operated braking system, generically disclosed in the companion application filed March 31, 1930, Serial No. 440,276 (patented July 23, 1935, No. 2,008,728). This system, generically, is particularly adapted for use with vehicle wheels employing tires of the "super-balloon" type, a structure in which the body of the wheel forms a minor portion of the diameter of the wheel; the system may be employed otherwise, but is designed to meet the conditions of providing adequate braking action for wheels of this particular type, with the brake mechanism enclosed or housed by the body of the wheel, although the dimensions of the latter are small.

To provide for adequate braking action, opposing side walls of the wheel body are provided with annular braking surfaces which extend obliquely to the wheel axes and in spaced-apart relation, the faces opposing each other at opposite angles. The brake mechanism co-operating with these surfaces, and which is located within the space between the wheel side walls, includes a plurality of radially movable pistons each mounted in cylinder formations carried by a fixed spider mounted coaxial with the wheel axis, the arrangement of pistons and cylinders being more or less symmetrical about such axis. The pistons are moved outwardly by hydrostatic pressure applied at the inner ends of the pistons through suitable connections with a source of supply and controlled in suitable manner, as by a brake pedal.

The piston movements are designed to actuate brake-shoe formations individual to the pistons, and which are designed to co-operate with the braking surfaces when the shoe formations are moved radially outward by the outward movement of the pistons. The opposite movement—radially inward—of the shoe formations and pistons, is provided generally by spring pressure, which may be applied in various ways, but generally by connecting adjacent shoe formations together by a spring or springs, the tension of the springs—when the hydrostatic pressure has been released—serving to move the formations inwardly and thus provide a corresponding movement to the pistons.

The system involves other features, as will be understood from the companion application identified above, but the above recited features are sufficient to indicate broadly the conditions within which the present invention is active, and permit of an understanding of some of the problems which are solved by the present invention, the latter pertaining particularly to the brake shoe formations of the system referred to.

As will be understood, the small dimensions of the space available for the brake mechanism installation, presents a material problem, not simply structurally, but to obtain the necessary brake-pounds pressure which is essential for efficient brake action; with some installations such pressure may be in excess of 100,000 brake pounds. This must be obtained with structures capable of being properly housed within the small dimensions of the wheel body. Since the radial dimensions permitted are comparatively small, the annular brake surfaces are of relatively small diameter, and the shoe formations are designed to present an individual segmental brake face for each of the braking surfaces, the two faces being designed to be brought concurrently into activity with the braking surfaces by the outward radial movement of the piston which supports and actuates the shoe formation.

This latter condition tends to control somewhat the character and dimensions of the braking surfaces and faces, as well as their dimensions, since the movement of the formation is by a single piston, and the radial movement of the latter sets up the condition that, to provide efficient concurrent action, the piston need be located at the radial axis of the formation. Since the piston must have a sufficient diameter to ensure proper action of the mechanism when the pressure is applied, it can be understood that there is thus presented a practical requirement that the pair of segmental brake faces be spaced apart a considerable distance—preferably outside of the piston dimensions. Because of this condition the braking surfaces carried by the side walls of the wheel body, must be at a point which will permit these brake faces to act efficiently.

It can be understood that the brake shoe formation and the piston which actuates it cannot be an integral structure for efficient service. The piston must necessarily travel in a fixed path, while the brake-shoe members must be sufficiently flexible in action as to accommodate for the various possibilities of service action. Such flexibility can be obtained by making the piston and brake-shoe formation as separate elements, but arranged in such manner that the flexibility will not affect the positive and direct brake application by the piston when the power is applied to move the latter radially outward. In other words, the brake-shoe formation must be co-related with the piston structurally to ensure that the power of the piston will be applied effectively to the formation, and yet permit the formation itself to have the necessary flexibility in service action as will provide efficient service and prevent damage to the parts.

A further problem is brought about by the service conditions. When the brake faces are applied to the braking surfaces—the latter being carried by the rotating wheel—the heavy friction present inherently tends to carry the formation with the rotating braking surfaces; since the shoe formations are not integral with the pistons, the latter cannot well serve as a restraining element. As a result, it is necessary that the brake assembly mechanism, other than the piston, provide a structure which will co-operate with the shoe formation to prevent this tendency of the formation to advance, so that the proper relation between the piston and formation will be maintained. Obviously, the shoe formation itself must carry a portion of this restraining structure to provide the co-operation.

And, in addition, the presence of the segmental formation of the brake shoes and their wide spacing, presents an additional problem in assuring effective action of the entire length of the segmental face; and this is complicated by the tendency of the formation to advance when the shoes are active. Consequently, the shoe formation must carry a bracing system such as will not only prevent collapse of the formation but to aid in restraining the advance trend, since the entire surface of the segments is active in producing the trend.

The above will indicate somewhat of the problems to be found within the setting of the present invention—the latter being the brake shoe formation or unit referred to—and which must have the general characteristics indicated, in order that it may efficiently operate within the system referred to.

The system itself has been developed in a number of different types and for different services—these being disclosed in companion applications hereinafter identified as well as in other companion applications, and these conditions necessarily provide for variations structurally of the brake-shoe formation or unit utilized. In some cases the piston is comparatively long—in others it is short, referring to the radial length of the mechanism assembly; this change affects the shoe formation structure. Other variations are required to meet particular characteristics of the system installation and these have their effect in the shoe formation structure. But in all cases, there is present the same fundamental characteristics pointed out above, these being fundamental conditions presented by the system itself, of which the brake shoe formation forms an important essential.

This invention, therefore, has for its object, the provision of a brake shoe formation or unit of a type such as will meet the characteristics indicated above; which will provide for efficient operation within the system, which will withstand the rigors of service, which will have the strength and lightness essential in an installation of this type, and which can be readily manufactured and installed.

To these and other ends, therefore, the nature of which will be better understood as the invention is hereinafter disclosed, said invention consists in the improved construction and combination of parts, hereinafter more fully described, illustrated in the accompanying drawings, and more particularly pointed out in the appended claims.

In the accompanying drawings, in which similar reference characters indicate similar parts in each of the views,—

Figure 5:
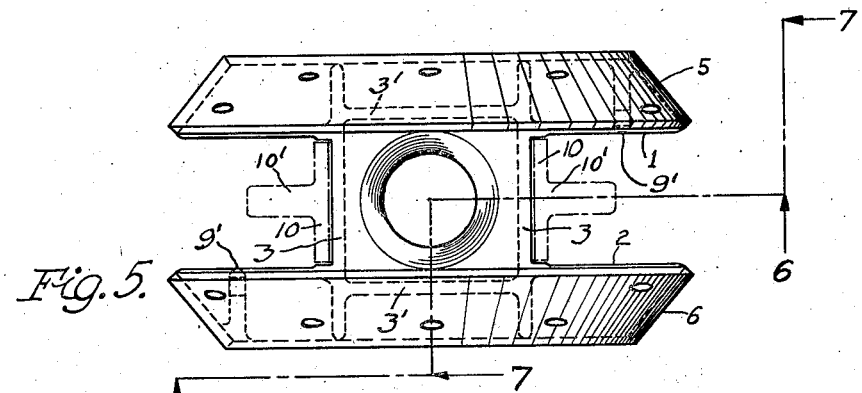
Fig. 5 is a top or plan view of a modified form of the invention.
Figure 6:
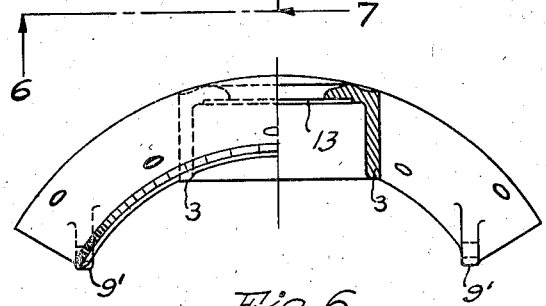
Fig. 6 is a view partly in side elevation and partly in section taken on line 6—6 of Fig. 5.
Figure 7:
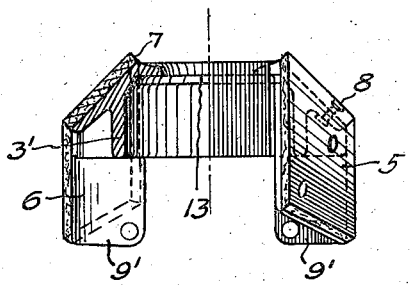
Fig. 7 is a view, partly in end elevation and partly in section, taken on line 7—7 of Fig. 5.
Figure 8:
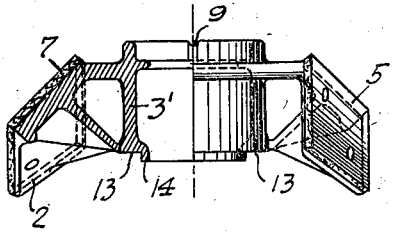
Fig. 8 is a view, partly in end elevation and partly in section of a further modification of the invention.

The form disclosed in Figs. 1 to 4, forms the brake-shoe formation disclosed in my companion application filed August 20, 1931, Serial No. 558,299 (patented November 5, 1935, No. 2,019,-508). The form shown in Figs. 5 to 7, is illustrated as a brake shoe formation in my companion applications filed October 8, 1931 (Serial No. 567,672) and January 4, 1932 (Serial No. 584,666), respectively. The form shown in Fig. 8 is disclosed as the brake shoe formation in companion application filed February 2, 1932, Serial No. 590,412. These applications present various types of application of the general system described above.

Figure 9:
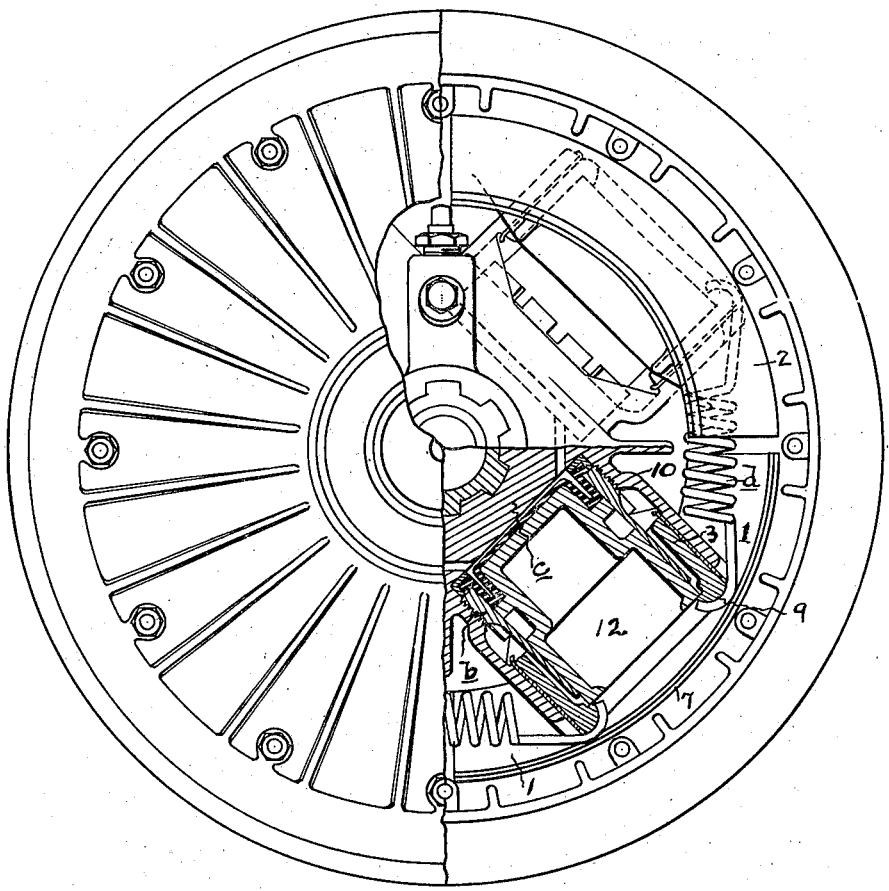
Fig. 9 is a view, partly in elevation and partly in section, of the central zone of a wheel of the internal brake mechanism type, to illustrate the general arrangement of the braking mechanism and the relation of the invention hereof in such mechanism.

Referring first to the form shown in Figs. 1 to 4, the embodiment of the system disclosed in the companion application relates to airplane wheels, which, because of the stresses and strains, etc., incident to the service conditions, such as landing, etc., requires heavy duty conditions. In this embodiment, illustrated in Fig. 9 four pistons 12 and cylinders b are employed, these being carried by a spider c with adjacent cylinders having their axes at right angles. Hence, the brake shoes have an angular length sufficiently less than 90° to ensure the necessary movement radially to provide the inactive clearance between the brake shoes and braking surfaces. Adjacent shoe formations are connected by springs d which are expanded by the outward movement of the pistons while setting the brakes, the springs serving to return the formations to inactive position when the pistons are permitted to return by the pressure relief of the system. The spider c is fashioned to present a pair of projecting arms for each formation or unit, these being indicated herein by the dotted line structure 10 in Fig. 1, and forming the elements which restrain the unit against advancing angular by the friction of the set brakes.

Figure 4:
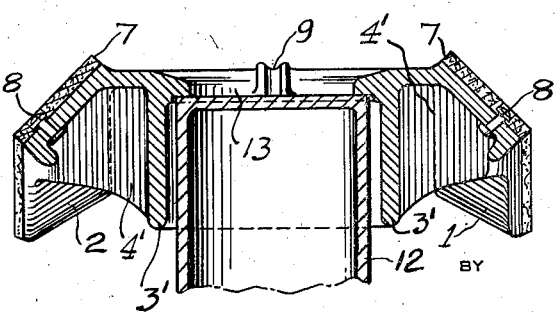
Figure 4 is a sectional view taken on line 4—4 of Fig. 2, a piston being indicated in dotted lines.

The formation or unit is provided with the opposite side members 1 and 2 extending in parallelism and symmetrically disposed relative to a central body, the latter being formed of members 3 extending transversely of the formation and connecting the side members 1 and 2, the members 3 being connected by members 3' which extend parallel with the members 1 and 2, all of these members being united as an integral structure disposed symmetrical to the axis of the unit, such axis corresponding to the axis of the piston with which it co-operates, the piston being indicated at 12, in Fig. 4.

The members 3 are integrally connected with the members 1 and 2 by webs 4 which serve to brace the end portions of the shoes 1 and 2, while members 3' are also connected with the side members 1 and 2 by webs 4' (Fig. 4), these serving to brace the shoes against collapse when the brakes are applied, the members 3' extending downwardly a proper distance to ensure the necessary web length for efficient service. As indicated in Fig. 4, the top portion of the side members 1 and 2 is joined to the tops of the members 3' by webs 3a, the webs 4' being below the webs 3a. The members 3 and 3' at their tops, are arranged to provide an inwardly-extending circular flange 3b co-axial with the piston, the opening of the flange being of less diameter than that of the piston, the under surface of the flange forming a surface which rests upon the upper end of the piston, as indicated in Fig. 4, the flange seat being indicated at 13. The flange is provided with spring seats 5, positioned on the fore and aft diameter, these seats being adapted to receive the ends of the tension springs d which connect the unit with the units in advance and in rear of the illustrated unit in the assembly.

The side members 1 and 2, while segmental in the fore and aft direction, present, in cross-section, their outer faces as flat or plane, these faces extending obliquely to the unit axis, as indicated in Fig. 4. These outer faces are accurately machined to be complemental to the braking surfaces with which they co-operate, these faces being covered by molded arcuate brake-lining structures 7 of uniform thickness, the latter being attached by rivets 8, the actual braking contact with the braking surfaces thus being provided by the lining 7.

Figure 1:
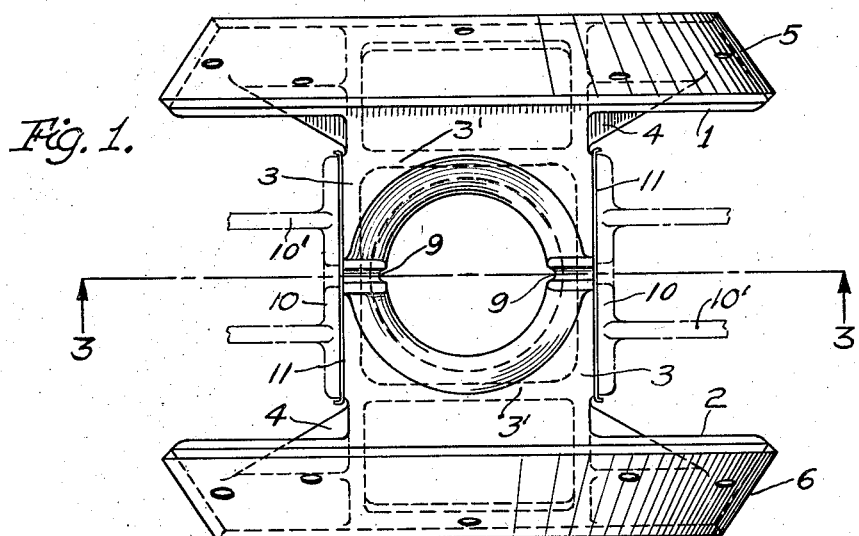
Figure 1 is a top or plan view of one form of brake-shoe formation or unit in accordance with the present invention, portions of the supporting structure being shown in dotted lines.
Figure 2:
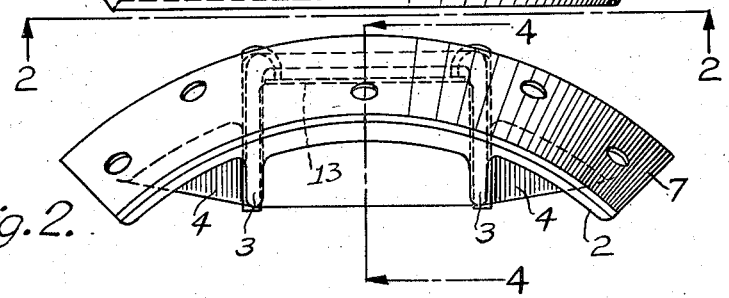
Fig. 2 is a side elevation of the structure of Fig. 1, looking in the direction of the arrows 2—2 of that figure.
Figure 3:
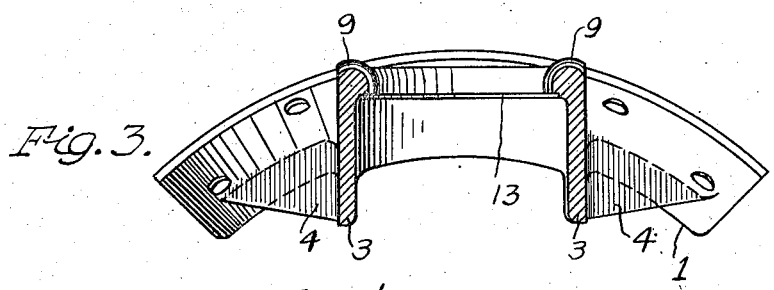
Figure 3 is a sectional view of the structure of Fig. 1, taken on line 3—3 of said figure.

As will be seen from Fig. 1, the members 3 are so spaced as to lie outside of the piston and approach the distance between the opposite arms 10 of the spider, the inner faces of the arms and the outer faces of the members 3 being accurately machined, with the spacing therebetween being taken up by shims 11. The arms 10 are shown as braced by webs 10'.

From the above it will be seen that although the shoe formation or unit is supported by the piston, being held in contact therewith by the tension springs which connect the units, there is no positive connection between the unit and piston otherwise, so that the structure is sufficiently flexible at this point to ensure that the service conditions of the unit will not affect the piston and the latter will be free to move radially within its cylinder at all times. The seat 13 of flange 3b will tend to retain the unit co-axial with the piston. At the same time, the positive restraint on the unit provided by the arms 10 of the spider, ensures that the unit will not "creep" in the fore and aft direction of the angular movement of the braking surfaces, and always ensure that the unit will be coaxial with the piston so far as the fore and aft direction is concerned, while permitting the radial movement of the unit under piston or spring power application. Since the oblique faces of the side members extend in opposite directions, it can be understood that should there be any tendency of the unit to shift transversely—unlikely because of the absence of strain when the unit is inactive—the setting of the brakes must inherently correct any difficulty in this respect.

The embodiments of the system which disclose the unit of Figs. 5 to 7 are designed more particularly for light-duty service, thus requiring less brake-pounds service of the system to meet the service conditions. As a result, the assembly is modified to some extent, including the transverse dimension of the unit.

Generally, the unit of Figs. 5 to 7, is similar to that of Figs. 1 to 4, with the exception that the bracing web formations are omitted for ordinary service conditions, since the unit is more compact, and less pressure is utilized in the operation. In these installations, the system generally utilizes but two of the units and pistons, these being located diametrically opposite. Since the spacing between the units is thus increased, the tension spring arrangement is varied by connecting the ends of the segmental shoes with those of the opposite unit, the shoes being provided with apertured lugs 9' to receive the ends of the springs, thus connecting the ends of the shoes together rather than connecting the central body portions together as in Figs. 1 to 4.

The embodiment of the system which discloses the form of Fig. 8, is also designed for heavy-duty service, such as trucks, etc., the arrangement utilizing the four pistons and units, as in Fig. 1, but being changed dimensionally in some respects. In this type the piston length is relatively short, the structure of the unit being changed to compensate for this change in piston length.

As indicated in Fig. 8, this latter change consists chiefly in shifting the piston-contacting seat 13 from the top of wall 3' to the bottom of such wall or member, the member formation being such as to provide an annulus 14 at such point to extend into the open end of the piston. The bracing web arrangement is changed slightly to accommodate for the change in conditions brought about by the lowering of the seat 13.

As will be understood, each of the forms provides a brake shoe formation or unit which, in service, is designed to provide opposing pressures relative to the complemental braking surfaces, with the pressures so applied as to combinedly center on the piston which is active in producing the pressures, the unit being movable radially to and from its brake-applying position. In addition, the segmental faces are so spaced that the piston pressures are applied intermediate the faces and upon a central body which distributes the pressures uniformly to the shoe segments, while permitting sufficient flexibility as between unit and piston as to prevent service conditions affecting the proper alinement of the piston with its cylinder. This spacing also permits of the presence of the restraining arms 10 of the spider as active between the braking faces, to prevent creeping of the unit during brake application and to ensure the proper relation between the axes of the unit and piston which operates it.

Other advantages of a structural type will be readily understood from the drawings, the whole being a formation that is relatively light in weight and at the same time capable of withstanding the heavy pressures and strains which result from the system in operation.

While I have herein shown and described several forms of brake shoe formation or unit, and assemblies in which they may be utilized, it will be readily understood that changes or modifications therein may be required or found desirable in meeting the exigencies of use, and I desire it to be understood, therefore, that I reserve the right to make any and all such changes or modifications therein as may be found essential in meeting the exigencies of installation and service, insofar as the same may fall within the spirit and scope of the invention as expressed in the accompanying claims when broadly construed.

Having thus described my invention, what is claimed as new is:

1. In hydrostatic-braking systems for wheels of the internal brake-mechanism type, wherein the brake-mechanism is located internal of the wheel with the latter forming a housing for the mechanism, wherein a plurality of brake-shoe units and corresponding pistons are symmetrically disposed about the wheel axis by a spider with the pistons and units movable radially concurrently under hydrostatic pressure control, wherein the units are operatively connected tensionally to provide pressure opposing the hydrostatic pressure to cause unit and piston movements in opposite directions, and wherein the co-operating braking surfaces are carried at opposing sides of the wheel body, the combination of such brake-mechanism assembly with the latter having the brake-shoe unit comprising a central body portion having an annular seat co-axial with its piston and adapted to co-operate with the piston in positioning the unit, said body carrying a pair of segmental brake face shoes extending in parallelism in spaced-apart relation with the spacing equal at least to the diameter of the piston end co-operating with such seat, said brake-faces in cross-section extending obliquely to the piston axis with the obliquity in opposite directions in the faces to co-operate concurrently with the system braking surfaces, whereby the unit and piston are maintained in co-operative relation while permitting service flexibility of the unit without affecting piston movements axially.

2. A unit as in claim 1 characterized in that the central body portion includes parallel members connecting the segmental faces, and members extending at substantial right angles thereto to form a frame structure for distributing pressures and strains uniformly and preventing collapse of the shoes in braking service.

3. A unit as in claim 1 characterized in that the central body portion includes parallel members connecting the segmental shoes, and members extending at substantial right angles thereto to form a frame structure for distributing pressures and strains uniformly and for preventing collapse of the shoes in braking service, said frame and shoes having connecting webs for relatively bracing the frame and shoes.

4. A unit as in claim 1 characterized in that the central body portion includes a frame structure opposing sides of which have machined faces adapted to co-operate with arms of the spider to permit unit radial movements while preventing unit creeping.

5. A unit as in claim 1 characterized in that the segmental shoes include a metallic shoe portion having a machined face, and a molded brake lining of uniform thickness secured on said face.

6. A unit as in claim 1 characterized in that the seat is carried by an annular flange located in the outer zone of the unit, whereby the piston will project within the unit.

7. A unit as in claim 1 characterized in that the body portion includes a wall extending inwardly in the direction of the unit axis and having the seat at its bottom, said wall having a piloting lip adapted to extend into the open end of the piston.

CLAUDE SAUZEDDE.